United States Patent
Palmer

[11] Patent Number: 6,061,952
[45] Date of Patent: May 16, 2000

[54] OUTDOOR PLANT PROTECTOR AND WATERING DEVICE

[76] Inventor: Eugene R. Palmer, 5977 Ellicott Rd., Brockton, N.Y. 14716-9717

[21] Appl. No.: 09/357,263

[22] Filed: Jul. 20, 1999

Related U.S. Application Data

[60] Provisional application No. 60/093,426, Jul. 20, 1998.

[51] Int. Cl.[7] ............... A47G 7/08; A47G 7/00; A01G 13/00
[52] U.S. Cl. .................. 47/27; 47/79
[58] Field of Search .............. 47/26, 27, 30, 47/75, 79

[56] References Cited

U.S. PATENT DOCUMENTS

| | | | |
|---|---|---|---|
| 135,173 | 1/1873 | Timby . | |
| 563,532 | 7/1896 | Williams . | |
| 608,664 | 8/1898 | Free | 47/79 |
| 2,141,484 | 12/1938 | Piglia | 47/28 |
| 3,158,524 | 11/1964 | Tong | 161/27 |
| 3,226,881 | 1/1966 | Garrett | 47/30 |
| 3,753,315 | 8/1973 | Adam | 47/79 |
| 4,885,870 | 12/1989 | Fong | 47/79 |
| 5,157,869 | 10/1992 | Minton | 47/75 X |
| 5,394,645 | 3/1995 | Wilson | 47/30 |
| 5,426,887 | 6/1995 | Spencer et al. | 47/21 |
| 5,505,020 | 4/1996 | North | 47/30 |
| 5,509,229 | 4/1996 | Thomasson et al. | 47/21 |

FOREIGN PATENT DOCUMENTS

| | | | |
|---|---|---|---|
| 2 570 925 | 7/1984 | France | 47/27 C |
| 927 181 | 4/1955 | Germany . | |
| 3023252 A1 | 1/1982 | Germany . | |

*Primary Examiner*—Peter M. Poon
*Assistant Examiner*—Jeffrey L. Gellner
*Attorney, Agent, or Firm*—Lovercheck and Lovercheck

[57] ABSTRACT

A plant protector and watering device made up of three stackable pieces which are a water collector in the shape of an inverted frustum of a cone, a frustoconical-shaped holding reservoir and a pot for collecting rain water, protecting a plant from sun, vermin and insects. The pot rests on the bottom of the holding reservoir. A doughnut-shaped water collector rests on the pot. The water collector rests on the inner surface of the holding reservoir. An auxiliary reservoir may be supported adjacent, to and connected to, the plant protector by means of a valve which regulates the level of water in the holding reservoir.

17 Claims, 2 Drawing Sheets

OUTDOOR PLANT PROTECTOR AND WATERING DEVICE

REFERENCE TO PRIOR ART

This application claims the benefit of U.S. Provisional Application Ser. No. 60/093,426, filed Jul. 20, 1998.

BACKGROUND OF THE INVENTION

This invention relates to plant protecting and watering devices and more particularly to a plant protecting and watering device which will collect rain water and make it available to a plant while protecting the plant from its environment.

Applicant is aware of the following U.S. Pat. Nos.: 135,173; 563,532; 2,141,484; 3,158,524; 3,226,881; 5,394,645; 5,426,887; 5,505,020; and, 5,509,229. Applicant is also aware of German Patent Nos. 927,181 and 3,023,252.

SUMMARY OF THE INVENTION

The plant protector is constructed of semi-flexible shatter resistant plastic and soft foam sheets which breaks down into three stackable pieces, (top frustum, water collector and reservoir), for easy transport and storage of several units. Applicant's invention protects the plant container from hot scorching sun, virtually eliminates evaporative water loss from plant container and water reservoir. Eliminates frequent watering, may eliminate all watering depending on conditions. Convenient use of water soluble fertilizes without losses through leeching to environment. Protects valuable and beautiful plants from snails, slugs and other crawling pests. It also helps protect plants from rodents and smaller animals The top frustum is made of a two piece snap together unit consisting of left and right halves to allow use of plants off-centered in the pot and for easy on and easy off. The top cone is round and slightly tapered for two to three inches out past the top rim of the pot and then tapers down more sharply towards the bottom of the pot, but not far enough to reach the water collector/reservoir unit. Several inches on the inside left and right center edges has ¼" thick by one inch wide soft foam sheeting to allow the plant stalk to pass through (not grow through) while eliminating water loss from the top side of the pot. The underside of the top cone has the same ¼" thick packing foam sheet cut into a circular doughnut shape that fits and contacts the upper rim of the pot preventing moisture loss and providing a soft no slip connection. The outer most edge of the top cone has four small equally spaced holes to anchor it by fishing string, etc. to the bottom water collector/reservoir during windy stormy conditions. The top cone reduces moisture loss from the top of the plant container and protects the top and sides from the hot sun.

The water collector reservoir is a two piece snap together unit consisting of an upper water collector and a lower holding reservoir. The bottom reservoir is much wider than the base of the pot or a large water collecting surface area, and a holding capacity of several gallons. The outer edge of the reservoir is tapered up to above the water line where the water collector pan snaps on top. The water collector is doughnut shaped with a foam lining on the inner circular edge. This allows the plant container base to slide in and down resting on the reservoir providing another evaporation resistant "sea" for the sides of the pot. The bottom reservoir has two small holes in it. The first hole is an overflow hole three inches up from the bottom to prevent drowning and the second is capped off at 2-¾" up from the bottom. This second hole with a removable cap can be used to hook up an optional second and totally separate water holding tank with a small diameter plastic hose for an extra water storage of several more gallons that is gravity fed to the pot reservoir.

It is an object of the present invention to provide an outdoor plant protector that protects the plant container from the hot scorching sun.

It is another object of the present invention to virtually eliminate evaporative water loss from plant container and water reservoir.

It is another object of the present invention to eliminate frequent watering. All watering may be eliminated depending on conditions.

It is another object of the present invention to provide convenient use of water-soluble fertilizer without losses to environment.

It is another object of the present invention to protect valuable and beautiful plants from snails, slugs and other crawling pests.

It is another object of the present invention to protect plants from rodents and smaller animals.

It is another object of the present invention to provide an outdoor plant protector that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
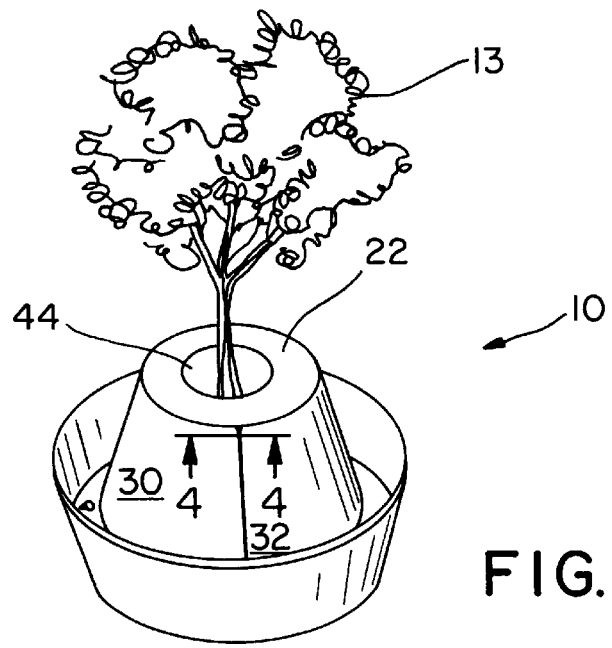
FIG. 1 is an isometric view of the plant protector according to the invention.
Figure 2:
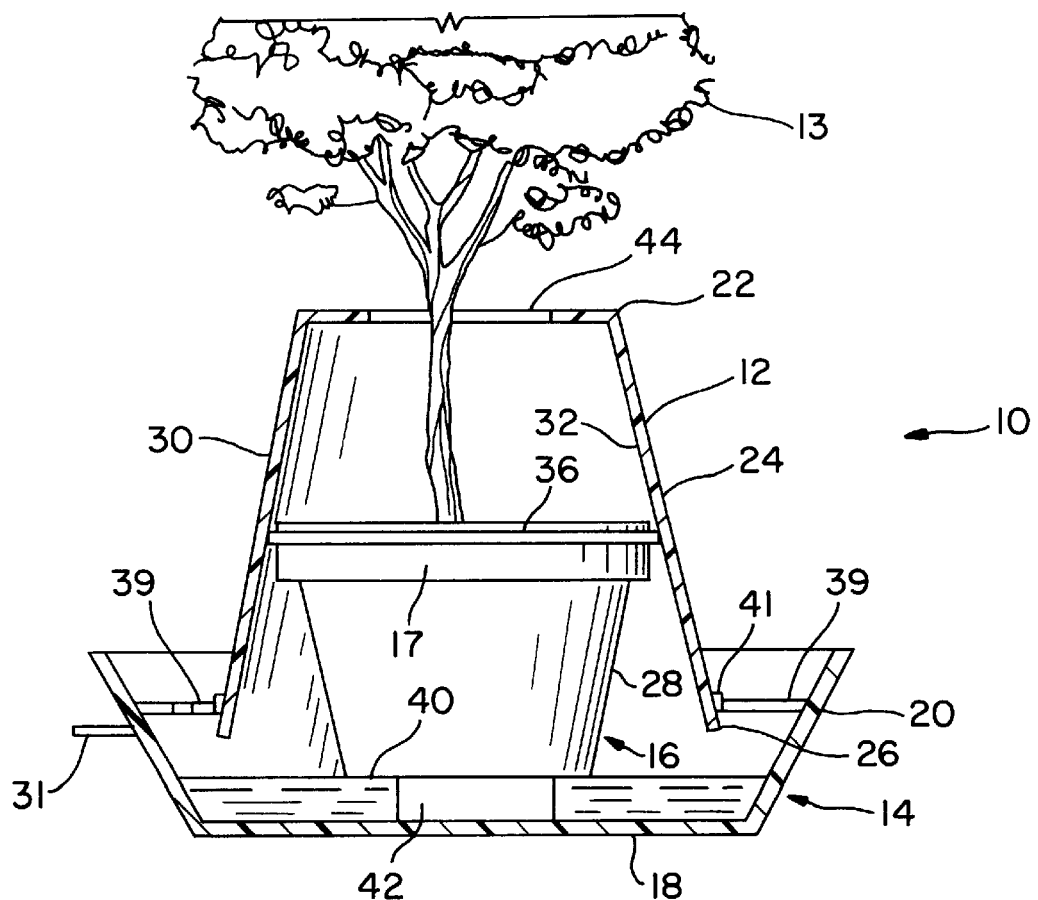
FIG. 2 is a longitudinal cross sectional view of the plant protector.

Now with more particular reference to the drawings, shown in FIG. 1 is watering device 10 is made up of water collector 12, holding reservoir 14 and pot 16.

Water collector 12, in the form of an inverted frustrum of a cone, has open top 22 and open bottom 26. Frustoconical sidewall 24 is fixed to top 22 to form an open top container. Water collector 12 is divided into left half side 30 and right half side 32 from open top 22 to open bottom 26. Plant 13 extends through opening 44 in open top 22.

Frustoconical-shaped holding reservoir 14 has bottom 18 and generally frustoconical sidewall 20 that is fixed to bottom 18 and extends upwardly and outwardly therefrom.

Pot 16 has bottom 40 which rests on bottom 18 of holding reservoir 14. Generally cylindrical frustoconical sidewall 28 is attached to pot bottom 40 and extends upwardly therefrom. Bottom 40 of pot 16 is spaced from bottom 18 of reservoir 14 by support 42. Open bottom 26 of water collector 12 receives pot 16 which rests on round rod loop 36 that is fixed to rim 17 of pot 16.

Frustoconical sidewall 24 of water collector 12 is received in central opening 41 of doughnut-shaped water collector plate 39. The outer periphery of collector plate 39 rests on the inside surface of frustoconical sidewall 20 of holding reservoir 14. Collector plate 39 has overflow control 31 therethrough which limits the water level in holding reservoir 14.

Figure 3:
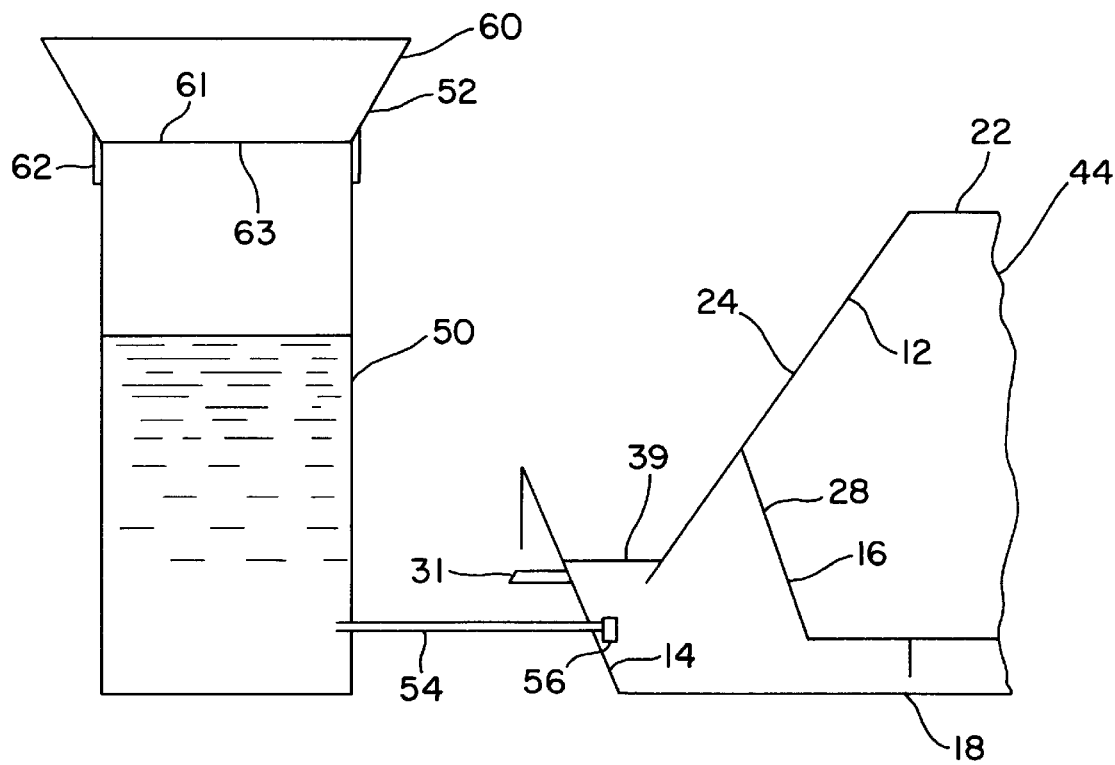
FIG. 3 is a partial view similar to FIG. 2, of another embodiment of the invention.

FIG. 3 shows cylindrical auxiliary reservoir 50 which collects water. Auxiliary reservoir 50 has snap-on cover 52 which has an upwardly and outwardly extending sidewall 60 to collect rain water, cover member 61 which extends across the lower end of sidewall 60, engaging member 62 which engages the upper end of auxiliary reservoir 50, and drain 63 which directs the rain water into the auxiliary reservoir 50, and is connected to holding reservoir 14 by tube 54 through a valve means in the form of float valve 56. Float valve 56 is controlled by float 58 that floats on the top of water in holding reservoir 14. When float 58 moves downward with the top surface of the water in holding reservoir 14, float valve 56 will be opened and will allow water from auxiliary reservoir 50 to enter holding reservoir 14 through tube 54.

Figure 4:
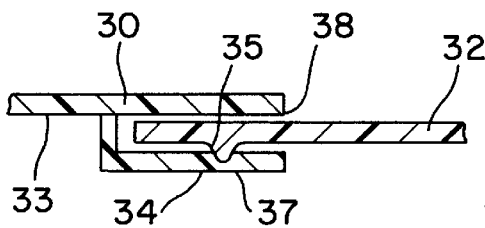
FIG. 4 is a cross setional view taken on line 4—4 of FIG. 1.

FIG. 4 shows a cross sectional view of water collector 12 taken on line 4—4 of FIG. 1 wherein right half side 32 and left half side 30 of water collector 12 are attached together by a snap connection so that left side half 30 can be separated and reconnected to right half side 32. The snap connection is made up of U-shaped slot 38 formed by leg 37 attached to left half side 30 at position 33. Leg 37 has recess 34 which receives detent 35 on right half side 32.

Figure 5:
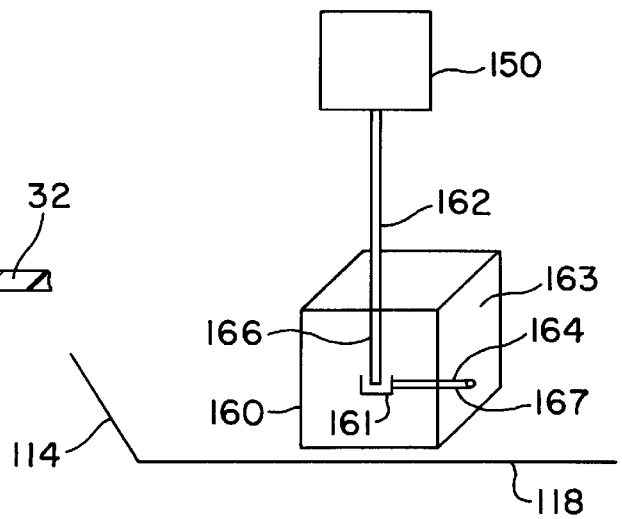
FIG. 5 is a partial view of a float valve to regulate additional water supplied from an additional reservoir.

As shown in FIG. 5, Applicant has provided another embodiment of a valve means in the form of simple regulator valve 160 to regulate the water coming from auxiliary reservoir 150. A block of material 163 having the properties of hard Styrofoam is seated on bottom 118 of holding reservoir 114. Hard, non-flexible, small-diameter first hose 162 is received in first hole 166, which is just large enough to allow snug free movement of hose 162 and up down. The upper end of first hose 162 is connected to auxiliary reservoir 150. Horizontal second hole 164 is drilled into block of material 163 to reach first hole 166 through which second hose 167 is inserted. Cup 161 receives hose 162. As water rises in holding reservoir 114, cup 161 and block of material 163 also rise to contact the lower end of first hose 162 and cut off the flow of water from auxiliary reservoir 150.

The foregoing specification sets forth the invention in its preferred, practical forms but the structure shown is capable of modification within a range of equivalents without departing from the invention which is to be understood is broadly novel as is commensurate with the appended claims.

What is claimed is:

1. A plant protector watering device comprising a water collector;

a holding reservoir and a pot;

said holding reservoir having a bottom and sidewall having an inner periphery extending upwardly from said bottom;

said water collector having an open top and a sidewall extending downwardly and outwardly from said open top and terminating in an open bottom;

said pot resting on said bottom of said holding reservoir;

said pot having a sidewall extending upwardly from a bottom of said pot and engaging an inner surface of said water collector; and, said holding reservoir being adapted to receive water from said water collector;

said open top of said water collector is adapted to receive the stem of a plant in said pot.

2. The device recited in claim 1 wherein said sidewall of said water collector extends downwardly below the top of said holding reservoir.

3. The device recited in claim 2 wherein said sidewall of said water collector extends through a doughnut-shaped water collector plate; and, said collector plate rests on said sidewalls of said holding reservoir.

4. The device recited in claim 3 wherein said collector plate is supported on the inner periphery of said sidewall of said holding reservoir.

5. The device recited in claim 4 wherein an overflow control is provided in said holding reservoir to control the depth of water therein.

6. The device recited in claim 3 wherein said collector plate has an outer periphery supported on said holding reservoir and an inner periphery supported on said water collector.

7. The device recited in claim 6 wherein an auxiliary reservoir is provided;

said auxiliary reservoir is connected to said holding reservoir by a float valve; and, said float valve having a float supported on the surface of water in said holding reservoir thereby controlling the water in said holding reservoir.

8. The device recited in claim 3 wherein said water collector is in the shape of an inverted frustum of a cone and slightly tapered at a short distance past said collector plate and then tapered down more sharply towards said bottom of said pot terminating above said bottom of said holding reservoir.

9. The device recited in claim 1 wherein said sidewall of said water collector extends through a doughnut-shaped water collector plate; and, said collector plate rests on said sidewalls of said holding reservoir.

10. The device recited in claim 9 wherein said collector plate is supported on the inner periphery of said sidewall of said holding reservoir.

11. The device recited in claim 10 wherein an overflow control is provided in said holding reservoir to control the depth of water therein.

12. The device recited in claim 9 wherein said collector plate has an outer periphery supported on said holding reservoir and an inner periphery supported on said water collector.

13. The device recited in claim 12 wherein an auxiliary reservoir is provided;

said auxiliary reservoir is connected to said holding reservoir by a float valve; and, said float valve having a float supported on the surface of water in said holding reservoir thereby controlling the water in said holding reservoir.

14. The device recited in claim 9 wherein said water collector is in the shape of an inverted frustum of a cone and slightly tapered at a short distance past said collector plate and then tapered down more sharply towards said bottom of said pot terminating above said bottom of said holding reservoir.

15. The device recited in claim 1 further comprising an overflow control in said water collector for determining the level of water in said collector.

16. In combination, a frustoconical shaped water collector having an opening in an open top thereof and a frustoconical-shaped holding reservoir below said water collector with said holding reservoir concentric to said water collector;

a pot supported on said bottom of said holding reservoir;

a doughnut-shaped water collector plate resting on said water collector;

said pot being received between said water collector and said collector plate and said holding reservoir;

said pot having a bottom supported on said bottom of said holding reservoir; and, a plant supported in said pot extending up into an opening in said open top of said water collector.

17. The combination recited in claim 16 wherein an auxiliary reservoir is provided adjacent said water collector; and, a valve means adapted to connect the inside of said auxiliary reservoir to said holding reservoir.

* * * * *